United States Patent
Rabah et al.

(10) Patent No.: US 11,888,237 B2
(45) Date of Patent: Jan. 30, 2024

(54) ANTENNA APPARATUS, ANTENNA SYSTEM AND METHOD OF OPERATION

(71) Applicant: AIRSPAN IP HOLDCO LLC, Boca Raton, FL (US)

(72) Inventors: Hassanein Daniel Rabah, Eton (GB); Andrew Logothetis, High Wycombe (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

(21) Appl. No.: 17/699,767

(22) Filed: Mar. 21, 2022

(65) Prior Publication Data

US 2022/0311138 A1   Sep. 29, 2022

(30) Foreign Application Priority Data

Mar. 29, 2021  (GB) ..................................... 2104424

(51) Int. Cl.
*H01Q 3/24* (2006.01)
*H01Q 3/34* (2006.01)
(Continued)

(52) U.S. Cl.
CPC ................. *H01Q 3/34* (2013.01); *H01Q 3/24* (2013.01); *H01Q 3/2647* (2013.01); *H01Q 21/0075* (2013.01)

(58) Field of Classification Search
CPC .......... H01Q 3/34; H01Q 3/24; H01Q 3/2647; H01Q 3/00; H01Q 21/0075; H01Q 21/0006; H04B 7/08; H04B 7/06
See application file for complete search history.

(56) References Cited

U.S. PATENT DOCUMENTS 7,180,447 B1   2/2007 Jacomb-Hood
9,810,774 B2 * 11/2017 Wittenberg ......... G01S 13/4463
(Continued)

FOREIGN PATENT DOCUMENTS

CN   106848579 A   6/2017
WO   2018142132 A1  8/2018

OTHER PUBLICATIONS

Chen et al., "Miniature 2.4-GHz Switched Beamformer Mdoule in IPD and Its Application to Very-Low-Profile 1D and 2D Scanning Antenna Arrays," IEEE 67th Electronic Components and Technology Conference, May 30, 2017, pp. 273-284.
(Continued)

*Primary Examiner* — Awat M Salih
(74) *Attorney, Agent, or Firm* — Haynes Beffel & Wolfeld LLP; Andrew L. Dunlap

(57) ABSTRACT

An antenna apparatus is provided that has a strip of antenna elements extending in a first dimension, and a signal processing interface for connection to signal processing circuitry. A plurality of beamforming networks are also provided, wherein each beamforming network is arranged, when coupled to the strip of antenna elements, to cause an associated beam pattern of the beamforming network to be generated by the strip of antenna elements. Switching circuitry is used to enable any one of the plurality of beamforming networks to be inserted between the strip of antenna elements and the signal processing interface. Each beamforming network couples a first node of the beamforming network with multiple second nodes of the beamforming network in accordance with a coupling pattern of that beamforming network. As a result, when the switching circuitry causes a given beamforming network to be inserted between the strip of antenna elements and the signal processing interface, the signal processing interface is coupled to the first node, each antenna element is coupled to an
(Continued)

associated one of the second nodes, and the coupling pattern of the given beamforming network causes the associated beam pattern to be generated by the strip of antenna elements.

18 Claims, 7 Drawing Sheets

(51) Int. Cl.
*H01Q 3/26* (2006.01)
*H01Q 21/00* (2006.01)

(56) References Cited

U.S. PATENT DOCUMENTS

| | | | |
|---|---|---|---|
| 2011/0026624 A1* | 2/2011 | Gummalla | H01Q 1/243 342/374 |
| 2012/0163510 A1 | 6/2012 | Cho et al. | |
| 2017/0229774 A1 | 8/2017 | Schuehler et al. | |
| 2018/0026696 A1* | 1/2018 | Hansen | H04W 74/002 370/336 |
| 2022/0021125 A1* | 1/2022 | Baligh | H01Q 21/0018 |

OTHER PUBLICATIONS

EP Search Report from EP22158645.6 dated Aug. 5, 2022, 10 pages.
Salman et al., "System Modeling and Simulation in 5G: A Hybrid Beamforming Approach With Power Flux Equalization in the Elevation Plane," Proc. of the 49th European Microwave Conference, Paris France, Oct. 1, 2019, pp. 746-749.
GB Search Report from GB2104424.3 dated Aug. 25, 2021 4 pages.

* cited by examiner

ANTENNA APPARATUS, ANTENNA SYSTEM AND METHOD OF OPERATION

BACKGROUND

The present technique relates to an antenna apparatus, antenna system and method of operation of such an apparatus and system.

In modern wireless communication systems, there is a desire to use spatial beamforming techniques when communicating between base stations and user terminals to seek to reduce system interference and increase network capacity. To achieve such spatial beamforming, an array of antenna elements may be provided, and then beamforming techniques can be applied in one or more dimensions to seek to alter the resultant beam pattern in three dimensional space. For example, a two-dimensional (2D) beamforming approach can be employed where beamforming techniques are used in two orthogonal dimensions, for example to achieve both horizontal and vertical beam steering.

However, the provision of such beamforming techniques can introduce significant cost and complexity into the antenna design. For example, when using electronic beamforming techniques to achieve such 2D beamforming, it may be necessary to provide separate radio components for each of the individual antenna elements. Further, such 2D beamforming can result in a splitting of the available radio frequency resources that can cause coverage limitation in some directions. This is due to government's regulations on the total conducted power at the input of the antenna array.

Accordingly, it would be desirable to provide an improved mechanism for performing spatial beamforming, that can allow a reduction in cost and complexity of the resultant antenna apparatus.

SUMMARY

In a first example arrangement, there is provided an antenna apparatus comprising: a strip of antenna elements extending in a first dimension; a signal processing interface for connection to signal processing circuitry; a plurality of beamforming networks, wherein each beamforming network is arranged, when coupled to the strip of antenna elements, to cause an associated beam pattern of the beamforming network to be generated by the strip of antenna elements; switching circuitry to enable any one of the plurality of beamforming networks to be inserted between the strip of antenna elements and the signal processing interface; each beamforming network coupling a first node of the beamforming network with multiple second nodes of the beamforming network in accordance with a coupling pattern of that beamforming network; wherein when the switching circuitry causes a given beamforming network of the plurality of beamforming networks to be inserted between the strip of antenna elements and the signal processing interface, the signal processing interface is coupled to the first node, each antenna element is coupled to an associated one of the multiple second nodes, and the coupling pattern of the given beamforming network causes the associated beam pattern to be generated by the strip of antenna elements.

In a second example arrangement, there is provided an antenna system that comprises a plurality of instances of the antenna apparatus of the above-described first example arrangement. Within the antenna system, the strip of antenna elements of each instance of the antenna apparatus is positioned relative to the strip of antenna elements of each other instance so as to collectively form a two-dimensional array of antenna elements, such that corresponding antenna elements from each strip of antenna elements extend in a second dimension orthogonal to the first dimension.

In a yet further example arrangement, there is provided a method of controlling an antenna beam comprising: providing a strip of antenna elements extending in a first dimension; providing a plurality of beamforming networks, wherein each beamforming network is arranged, when coupled to the strip of antenna elements, to cause an associated beam pattern of the beamforming network to be generated by the strip of antenna elements; and employing switching circuitry to allow any one of the plurality of beamforming networks to be inserted between the strip of antenna elements and a signal processing interface used for connection to signal processing circuitry; each beamforming network coupling a first node of the beamforming network with multiple second nodes of the beamforming network in accordance with a coupling pattern of that beamforming network; wherein when the switching circuitry causes a given beamforming network of the plurality of beamforming networks to be inserted between the strip of antenna elements and the signal processing interface, the signal processing interface is coupled to the first node, each antenna element is coupled to an associated one of the multiple second nodes, and the coupling pattern of the given beamforming network causes the associated beam pattern to be generated by the strip of antenna elements.

In a still further example arrangement, there is provided an antenna apparatus comprising: a strip of antenna element means extending in a first dimension; a signal processing interface means for connection to signal processing means; a plurality of beamforming network means, wherein each beamforming network means, when coupled to the strip of antenna element means, is for causing an associated beam pattern of the beamforming network means to be generated by the strip of antenna element means; switching means for enabling any one of the plurality of beamforming network means to be inserted between the strip of antenna element means and the signal processing interface means; each beamforming network means coupling a first node of the beamforming network means with multiple second nodes of the beamforming network means in accordance with a coupling pattern of that beamforming network means; wherein when the switching means causes a given beamforming network means of the plurality of beamforming network means to be inserted between the strip of antenna element means and the signal processing interface means, the signal processing interface means is coupled to the first node, each antenna element means is coupled to an associated one of the multiple second nodes, and the coupling pattern of the given beamforming network means causes the associated beam pattern to be generated by the strip of antenna element means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
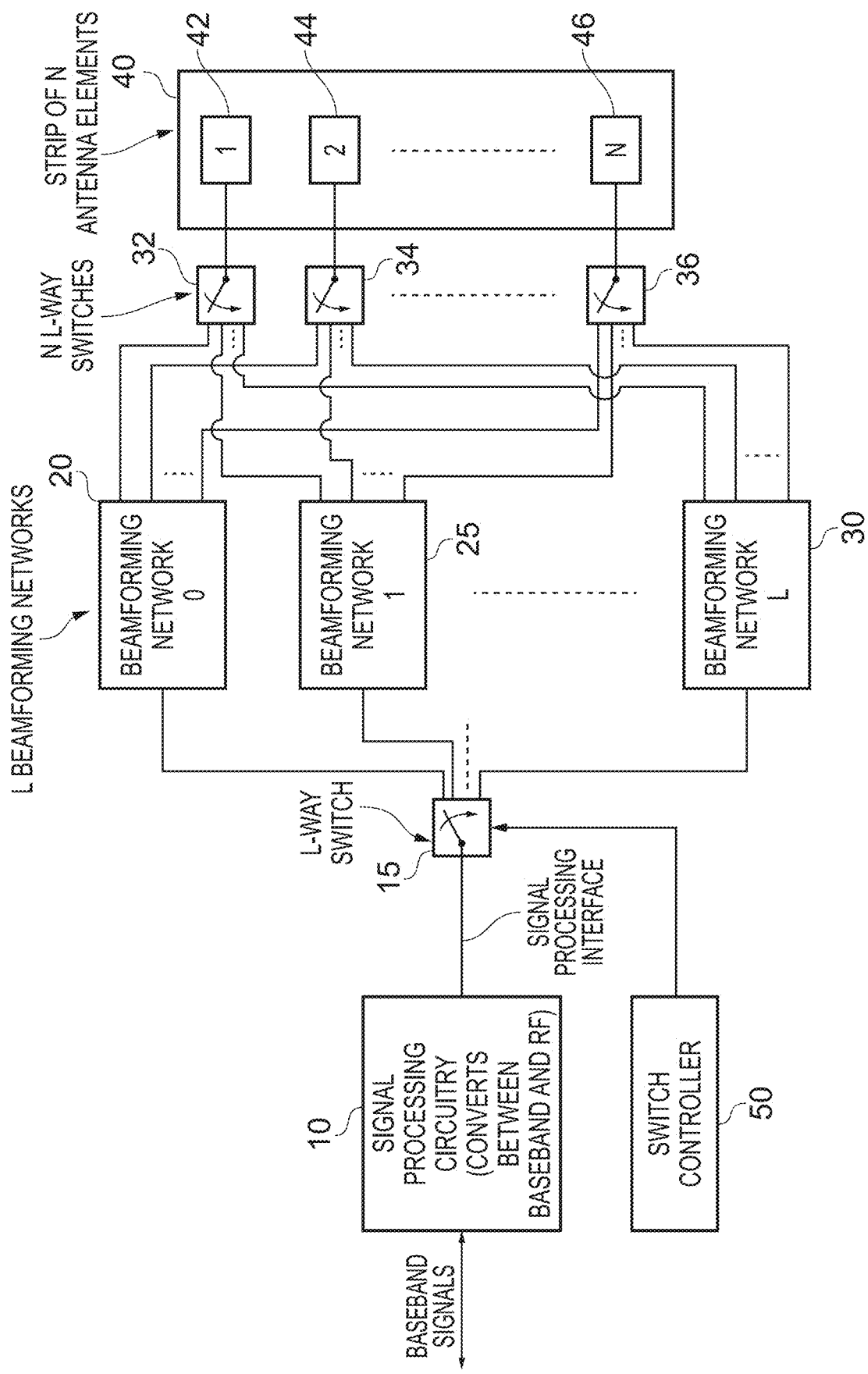
FIG. 1 is a block diagram of an apparatus in accordance with one example arrangement.

In one example arrangement an antenna apparatus is provided that has a strip of antenna elements extending in a first dimension, and a signal processing interface for connection to signal processing circuitry. The signal processing circuitry may itself be part of the apparatus, or may be provided externally to the antenna apparatus.

The antenna apparatus also has a plurality of beamforming networks, wherein each beamforming network is arranged, when coupled to the strip of antenna elements, to cause an associated beam pattern of the beamforming network to be generated by the strip of antenna elements. Such a beam pattern may be used in association with transmission of signals from the antenna apparatus, reception of signals by the antenna apparatus, or both transmission and reception activities.

The antenna apparatus further has switching circuitry than enables any one of the plurality of beamforming networks to be inserted between the strip of antenna elements and the signal processing interface. As a result, the switching circuitry can be used as required to switch between different beamforming networks, and thereby alter the beam pattern generated by the strip of antenna elements.

In accordance with the techniques described herein, each beamforming network is arranged to couple a first node of the beamforming network with multiple second nodes of the beamforming network in accordance with a coupling pattern of that beamforming network. Then, when the switching circuitry causes a given beamforming network of the plurality of beamforming networks to be inserted between the strip of antenna elements and the signal processing interface, the signal processing interface is coupled to the first node, and each antenna element is coupled to an associated one of the multiple second nodes. As a result, the coupling pattern of the given beamforming network causes the associated beam pattern to be generated by the strip of antenna elements.

By providing a set of different beamforming networks, and then selectively inserting one of those beamforming networks between the strip of antenna elements and the signal processing interface, this provides a low cost mechanism for varying the beam pattern generated by the strip of antenna elements. It also significantly reduces complexity, as there is no need to provide separate radio components for each antenna element within the strip of antenna elements. Instead, the coupling pattern of the currently selected beamforming network can be used to adjust the signals transmitted from, or received by, the individual antenna elements of the strip so as to achieve the associated beam pattern.

In accordance with one example implementation each beamforming network is arranged to implement analog beamforming via differential coupling of the multiple second nodes to the first node in accordance with the coupling pattern. The coupling pattern may cause one or more forms of signal processing to be applied to signals propagated between the first node and the multiple second nodes, but with the coupling pattern being such that the effects of the signal processing performed differ for different second nodes. This in turn causes the coupling pattern to influence the signals to be transmitted from, or the signals received by, the different antenna elements of the strip.

In one example implementation the coupling pattern defines a connection between each second node and the first node that introduces at least one of phase and amplitude differences between two or more of the multiple second nodes. The form of the connections provided can be varied in a number of ways in order to introduce relative phase and/or amplitude differences between two or more second nodes. For example, by using different lengths of connection between the first node and various different second nodes, then this can adjust the relative phase of the signals associated with those different second nodes. Further, by changing the thickness of the connections used between the first node and various different second nodes, this can be used to control the relative magnitude of the signals associated with those different second nodes.

The switching circuitry can be organised in a variety of ways. However, in one example implementation the switching circuitry comprises a signal processing interface switch to connect the signal processing interface to the first node of a selected beamforming network of the plurality of beamforming networks, and a plurality of antenna element switches, where each antenna element switch has a corresponding antenna element in the strip of antenna elements and is arranged to connect the corresponding antenna element to the associated one of the multiple second nodes of the selected beamforming network. Hence, through operation of the switching circuitry, different beamforming networks can be inserted between the strip of antenna elements and the signal processing interface at different points in time, and in each case the first node of the selected beamforming network will be coupled to the signal processing interface, and the relevant second node will be coupled to its associated antenna element within the strip of antenna elements.

There are a number of ways in which the plurality of beamforming networks can be implemented. However, in accordance with one example implementation, each beamforming network is provided within a corresponding layer of a multi-layered structure, with the switching circuitry enabling connection to be switched between different layers of the multi-layered structure in order to switch operation of the antenna apparatus between different beamforming networks. This provides a particularly compact and efficient implementation for providing the multiple beamforming networks. Further, advantage can be taken of existing, low cost, multi-layered structures within which to provide such beamforming networks. For example, in one implementation the multi-layered structure may be a multi-layer printed circuit board (PCB).

When using such a multi-layered structure within which to provide the multiple beamforming networks, then in one example implementation the switching circuitry and/or the strip of antenna elements may be mounted on the multi-layered structure, leading to a very compact and low cost design.

The strip of antenna elements can be organised in a variety of ways, but in one example implementation comprises N antenna elements positioned in a linear arrangement. Hence, the N antenna elements may be organised so as to extend linearly in the first dimension.

As mentioned earlier, each antenna element has an associated second node within each beamforming network. Whilst in one example implementation, more than one antenna element could have the same associated second node, and hence for instance the number of second nodes within each beamforming network may be less than the total number of antenna elements within the strip, in one particular example implementation each beamforming network has N second nodes so as to provide a unique second node for each antenna element in the strip.

The number of beamforming networks provided may vary dependent on the particular implementation, and may be different to the number of antenna elements within the strip. In one example implementation, the plurality of beamforming networks comprise L beamforming networks, and the switching circuitry provides L-way switching to allow any one of the beamforming networks to be selected.

The switch circuitry can be arranged to insert a chosen beamforming network at any suitable location between the signal processing interface and the strip of antenna elements. However, in one example implementation, the beamforming networks may be located such that the currently selected beamforming network transfers radio frequency (RF) signals between the first node and the multiple second nodes. For transmission this will involve passing RF signals from the first node to the multiple second nodes, whilst for reception this will involve transferring received signals from the multiple second nodes back to the first node. As discussed earlier, the beamforming network does not merely transport such signals, but also applies analog signal processing to the signals passing between the first and second nodes, for example to introduce relative changes in amplitude and phase of the signals in order to implement the associated beam pattern of the selective beamforming network.

The associated beam pattern for each beamforming network can take a variety of forms, and indeed different types of beam pattern can be associated with different beamforming networks. In one example implementation, for at least one beamforming network the associated beam pattern is a cosecant-squared pattern. A cosecant-squared pattern is a form of constant height pattern that is particularly suitable for use in air-to-ground communication systems. Such patterns permit an adapted distribution of the radiation in the beam and cause a more ideal space scanning. At any particular height, such a cosecant-squared pattern can achieve a constant received power independent of the range of the target (for example an aircraft) from the antenna apparatus.

One example use case for the antenna apparatus described herein is in relation to an air-to-ground (ATG) communication system for communication between moving aircraft and a network of ground stations. Such systems, can, for example, be used to provide a Wi-Fi hotspot within the aircraft in order to provide connectivity to the passengers in the aircraft. Within such systems it can be beneficial to arrange for one or more of the beamforming networks to produce an associated beam pattern that is a cosecant-squared pattern. Different beamforming networks can then for example be switched between dependent on the height of the aircraft that is seeking to be communicated with. However, there is no requirement for all of the beamforming networks to have cosecant-squared beam patterns, and if desired one or more of the beamforming networks may have different forms of beam pattern associated therewith. For example, in some instances it may be desirable to form a highly directional beam, and accordingly one or more of the beamforming networks may have an associated beam pattern that produces such a highly directional beam.

Whilst the above described antenna apparatus has a strip of antenna elements, with a plurality of beamforming networks associated with that strip of antenna elements that can be switched between by associated switching circuitry, in one example implementation multiple instances of such an antenna apparatus can be combined within an antenna system so as to form a two dimensional array of antenna elements. For example, in one implementation an antenna system may be provided that has a plurality of instances of the antenna apparatus described earlier, with the strip of antenna elements of each instance being positioned relative to the strip of antenna elements of each other instance so as to collectively form a two dimensional array of antenna elements. Within such an arrangement, corresponding antenna elements from each strip of antenna elements may extend in a second dimension orthogonal to the first dimension.

By such an approach, the antenna system may provide for spatial beamforming in two different dimensions, with the beamforming in one of dimensions being performed using the earlier-mentioned beamforming networks, and with any suitable beamforming technique being used for performing the beamforming in the orthogonal dimension.

Such an antenna system may, in one example arrangement, further comprise beam control circuitry to generate a beamforming network selection signal to control the switching circuitry of each instance of the plurality of instances of the antenna apparatus. In one particular example implementation, the beam control circuitry is arranged to cause the switching circuitry of each instance of the plurality of instances of the antenna apparatus to receive the same beamforming network selection signal so that at any point in time the same beamforming network is selected within each instance of the antenna apparatus. Hence, in such an arrangement, at any point in time the beam pattern produced in the first dimension is the same for each of the instances of the antenna apparatus provided within the antenna system.

In one example implementation, the beam control circuitry is arranged to control beamforming of a beam produced by the two dimensional array of antenna elements in the first dimension by controlling selection of the beamforming network used by the plurality of instances of the antenna apparatus. However, the system may also comprise additional beam control circuitry to perform a beam control operation to control beamforming of the beam produced by the two dimensional array of antenna elements in the second, orthogonal, dimension.

The techniques employed by the additional beam control circuitry can vary dependent on implementation, but in one example implementation the additional beam control circuitry is arranged to perform the beam control operation by employing a digital beamforming operation. Hence, in such an arrangement, the antenna system employs a hybrid beamforming approach, where in the first dimension the selection between different beamforming networks is used to perform analog beamforming, whilst in the second dimension digital beamforming is used. This can provide a system with significantly reduced complexity relative to known systems, whilst providing a great deal of flexibility in the choice of beam pattern produced. It can also significantly reduce the cost of providing such two dimensional beamforming. For example, separate radio components do not need to be provided in association with each antenna element in the array, since in accordance with the described design all of the antenna elements in a particular strip are controlled by a currently selected beamforming network.

There are various different digital beamforming operations that can be employed. However, in one example implementation the additional beam control circuitry is arranged to perform the beam control operation in order to independently control weightings applied to the signals processed by each instance of the antenna apparatus so as to control a beam pattern of the beam in the second dimension. Such weightings can be used in the second dimension to control both the beam shape and the beam direction, and in one example implementation such functionality can be implemented by a precoder component.

The first dimension and the second dimension will vary dependent on the orientation of the antenna system. However, in one example implementation the first dimension is an elevation dimension and the second dimension is an azimuth dimension. It has been found that by using the above describe analog beamforming technique, employing selectable switching between different beamforming networks, this can provide a simple, low cost mechanism for achieving suitable beam patterns in the elevation dimension. For example, one or more different variants of the earlier-mentioned cosecant-squared pattern can be provided by a corresponding number of beamforming networks, with the ability to switch between those beamforming networks as and when desired.

It will be appreciated that by employing such two dimensional beamforming techniques within the above described antenna system, a great deal of flexibility can be achieved with regard to the radiation beam pattern produced in three dimensional space. For example, the above described analog beamforming technique, using the multiple different beamforming networks that can be switched between, enables the elevation beam pattern, i.e. that within a 2D cut of the 3D pattern in the elevation plane, to be varied between multiple different forms, with the number of different forms available being dependent on the number of different beamforming networks provided. Similarly, in the azimuth plane, digital beamforming techniques can be used to vary the beam pattern within the 2D cut of the 3D pattern in the azimuth plane.

Particular examples will now be described with reference to the figures.

FIG. 1 is a block diagram of an apparatus in accordance with one example configuration. The antenna apparatus consists of a strip 40 of N antenna elements 42, 44, 46, that are connected via associated switches 32, 34, 36 with a selected one of multiple beamforming networks 20, 25, 30. The selected beamforming network is also connected via the switch 15 to a signal processing interface that is coupled to signal processing circuitry 10. The signal processing circuitry 10 can be of a standard form, and perform signal processing to convert between baseband and radio frequency (RF) signals in either direction. The signal processing circuitry 10 can be provided as part of the antenna apparatus, or as a component external thereto.

The number of beamforming networks 20, 25, 30 provided may vary dependent on implementation, but in the example shown there are L beamforming networks, and each switch 15, 32, 34, 36 is an L-way switch so as to allow any one of the beamforming networks to be connected between the signal processing circuitry 10 and the antenna elements 42, 44, 46.

The switch 15 and the N switches 32, 34, 36 collectively form switching circuitry that, as will be appreciated from FIG. 1, enables any one of the beamforming networks 20, 25, 30 to be connected in the path between the strip of antenna elements 40 and the signal processing circuitry 10.

A switch controller 50 is provided for controlling both the switch 15 and each of the switches 32, 34, 36 (for ease of illustration in the figure the control signals from the switch controller to each of the switches 32, 34, 36 have been omitted). Each of the switches 15, 32, 34, 36 will receive the same control signal from the switch controller 50, so that at any point in time one of the beamforming networks 20, 25, 30 is connected in the path between the signal processing circuitry 10 and the strip of antenna elements 40.

Each of the beamforming networks has a first node that can be connected via the switch 15 to the signal processing circuitry 10, and multiple second nodes that can be connected via the switches 32, 34, 36 to the individual antenna elements 42, 44, 46 within the strip of antenna elements 40. Whilst in some implementations more than one antenna element can be associated with the same second node, in the example shown in FIG. 1 it is assumed that there is a separate second node provided by each beamforming network for each individual antenna element 42, 44, 46. Hence each beamforming network has a single first node for connecting via the switch 15 to the signal processing circuitry 10, and N second nodes for connecting to corresponding antenna elements 42, 44, 46 within the strip of antenna elements 40 via the associated switches 32, 34, 36.

Each beamforming network is arranged to implement analog beamforming via differential coupling of the multiple second nodes to the first node in accordance with a coupling pattern defined by that beamforming network. When a given beamforming network is connected in the path between the signal processing circuitry 10 and the strip of antenna elements 40, its coupling pattern causes an associated beam pattern to be generated by the strip of antenna elements 40. This beam pattern can be used either for transmission of signals from the antenna apparatus, reception of signals by the antenna apparatus, or both transmission and reception. Typically, the coupling pattern defined within each beamforming network will be different to the coupling pattern define within any other beamforming network, and as a result up to L different beam patterns can be generated by the strip of antenna elements 40, with the beam pattern produced at any particular point in time being dependent on the beamforming network 20, 25, 30 that has been connected into the path between the signal processing circuitry 10 and the strip of antenna elements 40.

The switch controller 50 can be used to control which beamforming network is connected into the path between the signal processing circuitry 10 and the strip of antenna elements 40 at any particular point in time, with the switch controller being able to switch between different beamforming networks as and when desired in order to alter the associated beam pattern produced by the strip of antenna elements 40.

It has been found that such an arrangement provides a simple and cost effective mechanism for enabling the strip of antenna elements to be used to produce a variety of different beam patterns. In particular, it is noted that separate signal processing circuits are not required in association with each of the antenna elements, and instead a single radio block can be provided for the entirety of the strip of antenna elements, with the currently selected beamforming network applying analog signal processing techniques in order to introduce differences, for example phase and amplitude differences, between the different second nodes, and hence between the different antenna elements in the strip of antenna elements 40.

Figure 2:
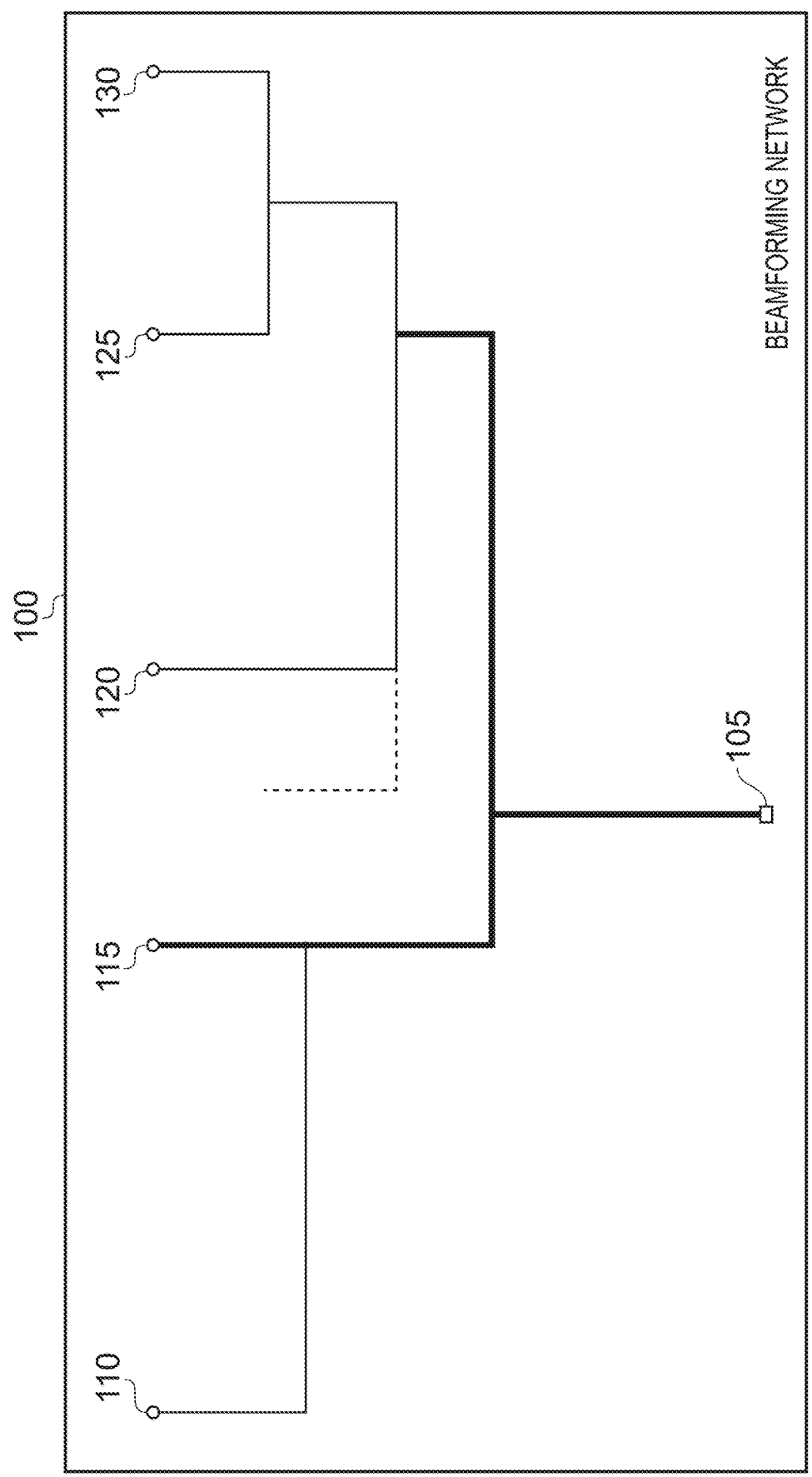
FIG. 2 schematically illustrates a beamforming network in accordance with one example arrangement.

FIG. 2 schematically illustrates the form of coupling pattern that may be provided within a beamforming network. In this example, the beamforming network 100 has an first node 105 that is connected via the coupling pattern to multiple second nodes 110, 115, 120, 125, 130. As will be apparent from FIG. 1, the first node 105 can be connected via the switch 15 to the signal processing circuitry 10, whilst the various second nodes 110, 115, 120, 125, 130 can be connected via associated switches 32, 34, 36 with corresponding antenna elements 42, 44, 46 within the strip of antenna elements 40.

As illustrated in FIG. 2, the connections provided between the first node 105 and the various second nodes 110, 115, 120, 125, 130 differ, for example in terms of length of the connection between a first node and different second nodes, and/or in terms of the thickness of the connection used. By varying the thickness and/or length of particular connections used to implement the coupling pattern of the beamforming network, it is possible to control the relative phase and amplitude of the signals routed between the first node 105 and the various antenna elements 42, 44, 46 via the associated second nodes 110, 115, 120, 125, 130. This can be used to implement a desired beam pattern generated by the strip of antenna elements 40 for transmission and/or reception.

Since a common signal is present at the first node 105, only a single instance of the signal processing circuitry 10 is required, and the differing relative phase and magnitude of signals transmitted from the antenna elements 42, 44, 46 arises as a result of the coupling pattern implemented by the selected beamforming network. Similarly, when used for reception, it will be seen that the coupling pattern alters the relative influence of the signals received by each of the antenna elements 42, 44, 46 as they are combined into a single reception signal passed from the first node 105 to the signal processing circuitry 10.

Figure 3:
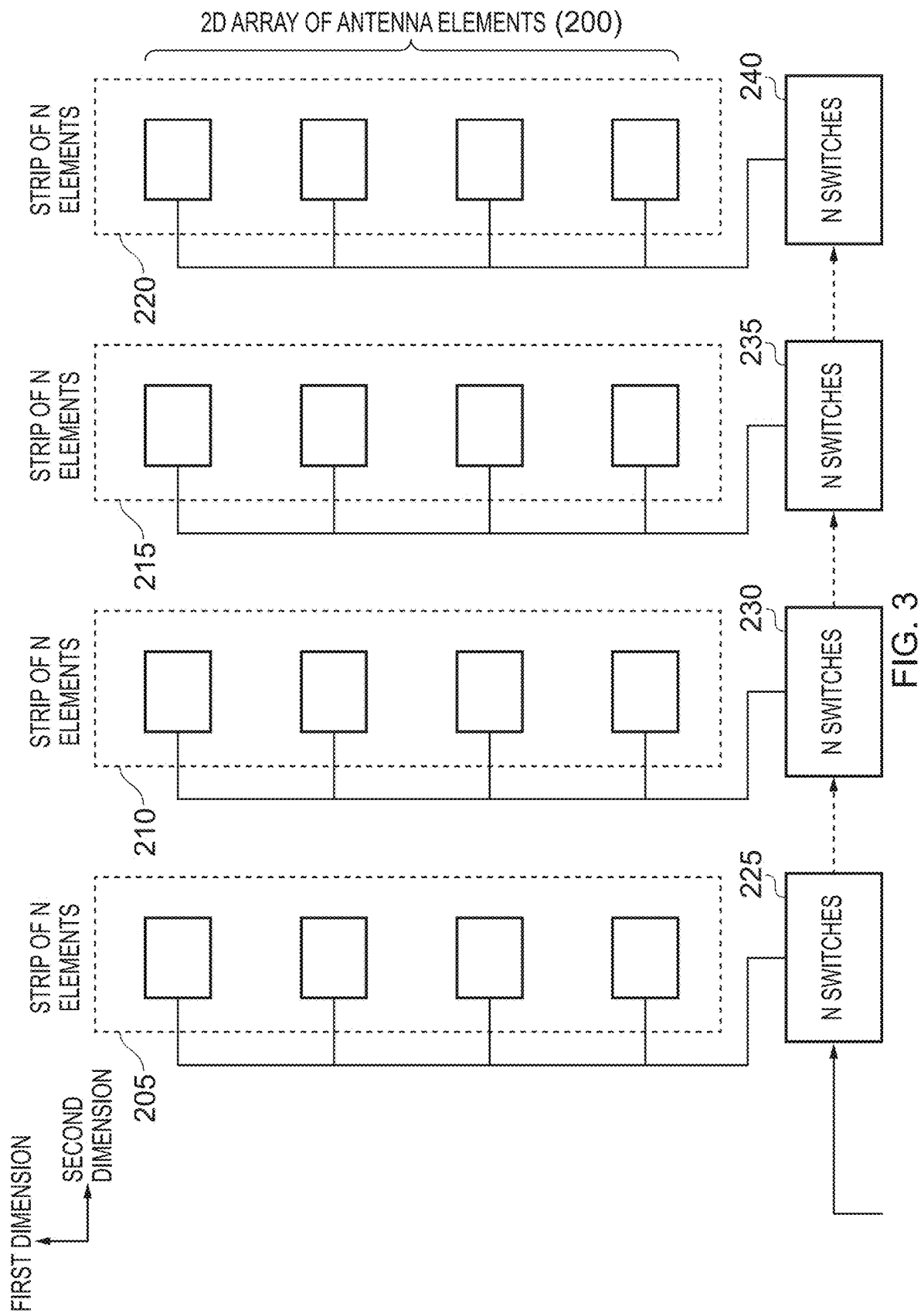
FIG. 3 is a block diagram of an antenna system in accordance with one example arrangement.
Figure 3:
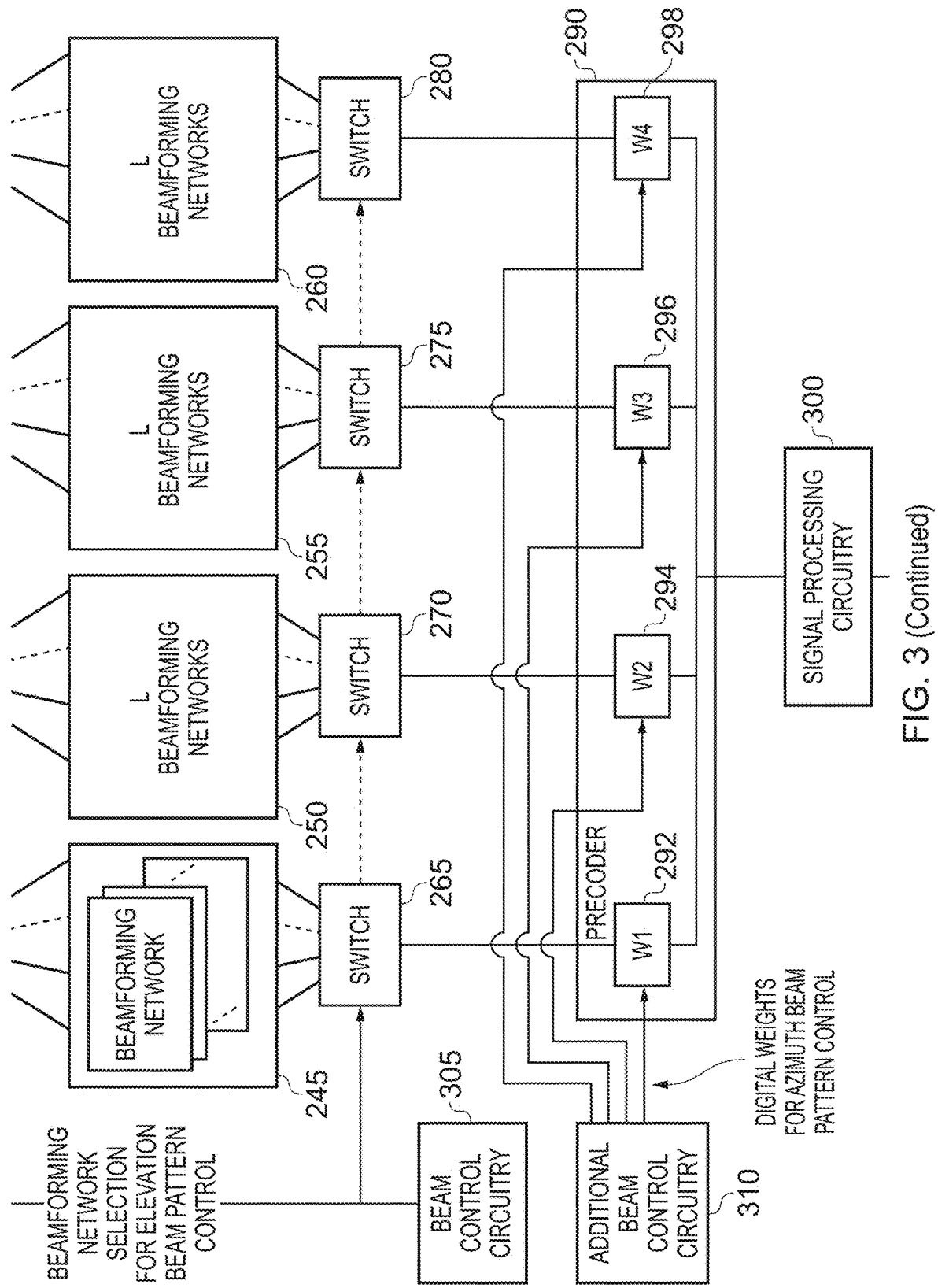

FIG. 3 is a diagram illustrating how various instances of the antenna apparatus shown in FIG. 1 can be incorporated within an antenna system comprising a two dimensional array of antenna elements 200. The array of antenna elements 200 can be considered to be formed of multiple strips of antenna elements 205, 210, 215, 220. As per the discussion of FIG. 1, for each strip of antenna elements, a corresponding set of switches and beamforming networks can be provided. Hence, for the strip 205, there will be associated switches 225, 265 enabling any one of multiple beamforming networks 245 to be connected in the path between the strip of antenna elements 205 and the signal processing circuitry 300 (via an intervening precoder 290 to be discussed in more detail below). Similarly, the strip of antenna elements 210 has associated switches 230, 270 and a plurality of beamforming networks 250, the strip of antenna elements 215 has associated switches 235, 275 and associated beamforming networks 255, and the strip of antenna elements 220 has associated switches 240, 280 and beamforming networks 260.

The beam control circuitry 305 takes a similar form to the switch controller 50 shown in FIG. 1, and is used to generate a beamforming network selection signal that can be used to drive each of the switches 225, 230, 235, 240, 265, 270, 275, 280.

Whilst there is a great deal of flexibility as to how the beamforming networks are provided, it is envisaged in one example implementation that each block of beamforming networks 245, 250, 255, 260 include the same plurality (L) of beamforming networks, and hence L different beam patterns are defined that can be used by the 2D array of antenna elements 200 as the beam pattern in a first dimension, the first dimension being the longitudinal dimension extending through the antenna elements of each strip. As discussed earlier, each beamforming network has an associated coupling pattern that implements an analog beamforming mechanism to vary the relative phase and/or amplitude of signals processed by the antenna elements within the associated strip of antenna elements, to thereby produce the associated beam pattern.

With regard to the second dimension orthogonal to the first dimension, different weights may be applied to the signals processed by each of the strip of antenna elements, as indicated by the weighting elements 292, 294, 296, 298 provided within the precoder 290. Additional beam control circuitry 310 can be used to generate the weights to be used by each of the weighting elements 292, 294, 296, 298. These various weights hence provide for digital beamforming in the second dimension, and this digital beamforming, in combination with the analog beamforming in the first dimension resulting from the selection of a particular beamforming network, allows a wide variety of different beam patterns to be produced by the 2D array of antenna elements 200.

As shown in FIG. 3, the precoder 290 can be coupled to signal processing circuitry 300 to perform the processing between baseband and radio frequency signals. In the example of FIG. 3, the weights of the precoder circuitry 290, as controlled by the additional beam control circuitry 310, are applied to RF signals. However, in an alternative implementation the components 290 and 310 may instead be incorporated within the signal processing circuitry 300, with the weights being controlled and applied in baseband. This latter option may for example be used for multi-user MIMO deployments.

In the example shown in FIG. 3, it is assumed that the first dimension is the elevation dimension, and the second dimension is the azimuth dimension, and hence analog beamforming, using the beamforming networks, is performed in the elevation dimension, whilst digital beamforming, using the various weights produced by the additional beam control circuitry 310, is used to control the beam in the azimuth dimension. However it will be appreciated that in other example implementations the antenna array 200 could be positioned in a different orientation.

The precoder 290 may in one example implementation consist of two parts, namely a precoder for MIMO (multiple-input multiple-output), and a precoder for beamforming. The first part employs short term weights to correct for fast fading channel conditions (in time or frequency), whilst the second part employs long term weights to account for slowly changing channel conditions, for example signal direction of arrival. It should also be noted that if MIMO is employed, the signal processing circuitry 300 will feed the precoder with multiple layers of data, as will be apparent to those of ordinary skill in the art.

As will be apparent from FIG. 3, whilst different weighting components 292, 294, 296, 298 are required for each of the columns of antenna elements (i.e. the various strips 205, 210, 215, 220), there is no requirement for separate weights to be generated for each of the antenna elements within a strip, thus significantly reducing complexity in the design. Instead, the required beam pattern in the first dimension can be achieved by the selection of the appropriate beamforming network using the beam control circuitry 305.

In the example of FIG. 3 it is assumed that the antennas are horizontally polarised. In an alternative implementation they may be all vertically polarised, or there may be cases where both horizontally and vertically polarised antennas are used. Further, instead of using the horizontal and vertical dimensions as polarisation dimensions, an alternative implementation may use +/−45 degree polarisation.

Figure 4:
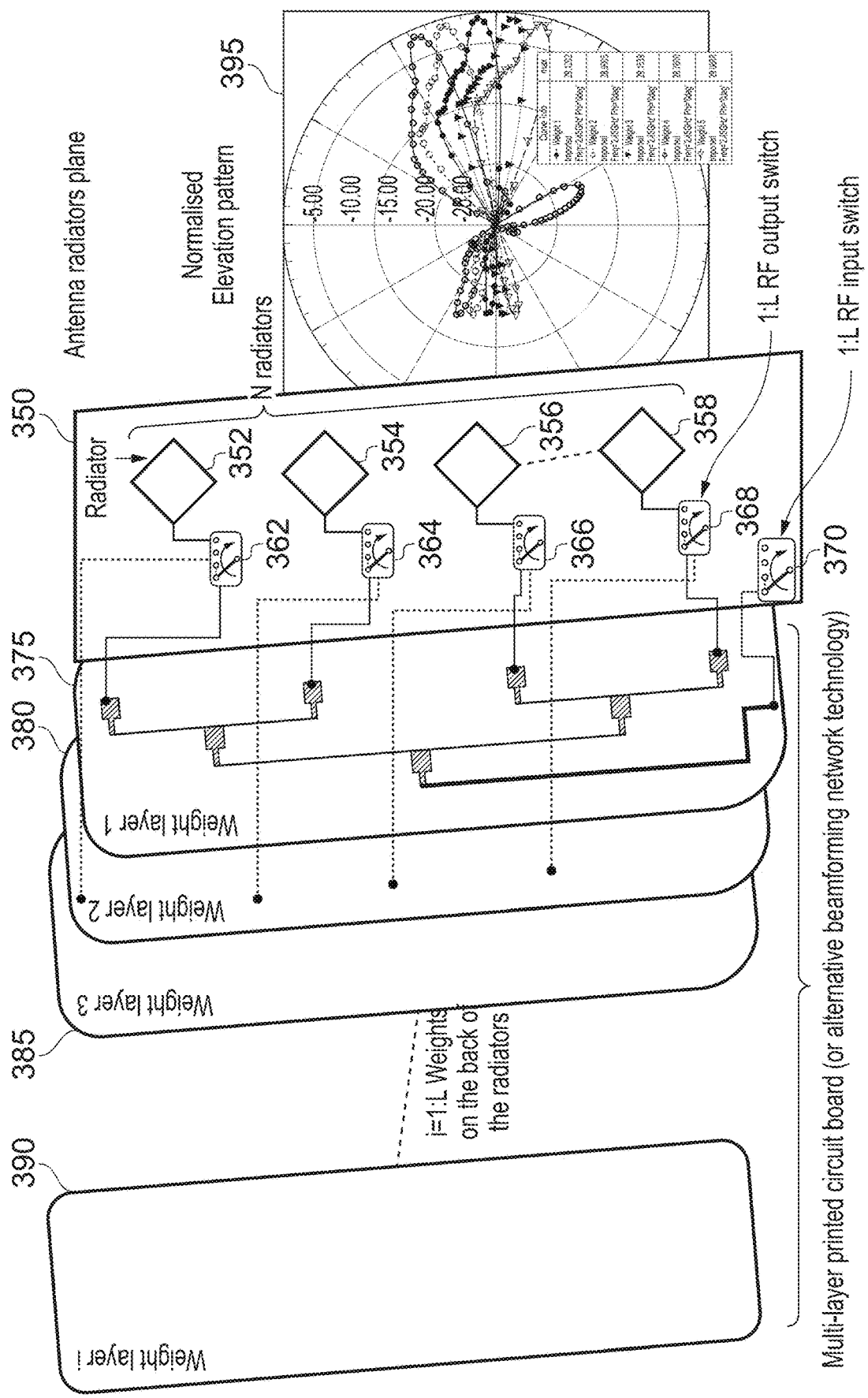
FIG. 4 schematically illustrates a multi-layer printed circuit board implementation for providing a strip of antenna elements and associated multiple beamforming networks, in accordance with one example arrangement.

There are a number of ways in which the various beamforming networks may be provided, but a particularly simple and cost effective solution is illustrated in FIG. 4. In this example, a multi-layer printed circuit board, or an alternative beamforming network technology, may be used to provide all of the different beamforming networks, these different beamforming networks being referred to in FIG. 4 as weight layers 375, 380, 385, 390. As will be apparent from the earlier discussion, each beamforming network effectively applies different weightings to the different radiator elements 352, 354, 356, 358 of a strip of antenna elements 350 due to the phase and/or magnitude variations that can be introduced via the coupling pattern defined by that beamforming network.

FIG. 4 illustrates how each radiator element 352, 354, 356, 358 is connected to an associated switch 362, 364, 366, 368, which in turn allow the strip of radiator elements to be connected to any of the beamforming networks 375, 380, 385, 390. Further, the switch 370 is provided to enable any one of the beamforming networks to be connected to the signal processing circuitry via the signal processing interface.

As shown in FIG. 4, in one example implementation the strip of radiator elements 352, 354, 356, 358 and the various switch components 362, 364, 366, 368, 370 can all be mounted on a surface of the multi-layer printed circuit board 350, resulting in a particularly simple and cost effective solution.

As illustrated by the schematic 395, different beam patterns will be generated by the strip of radiator elements, in dependence on which of the various beamforming networks 375, 380, 385, 390 are currently connected to the strip of radiator elements.

Figure 5:
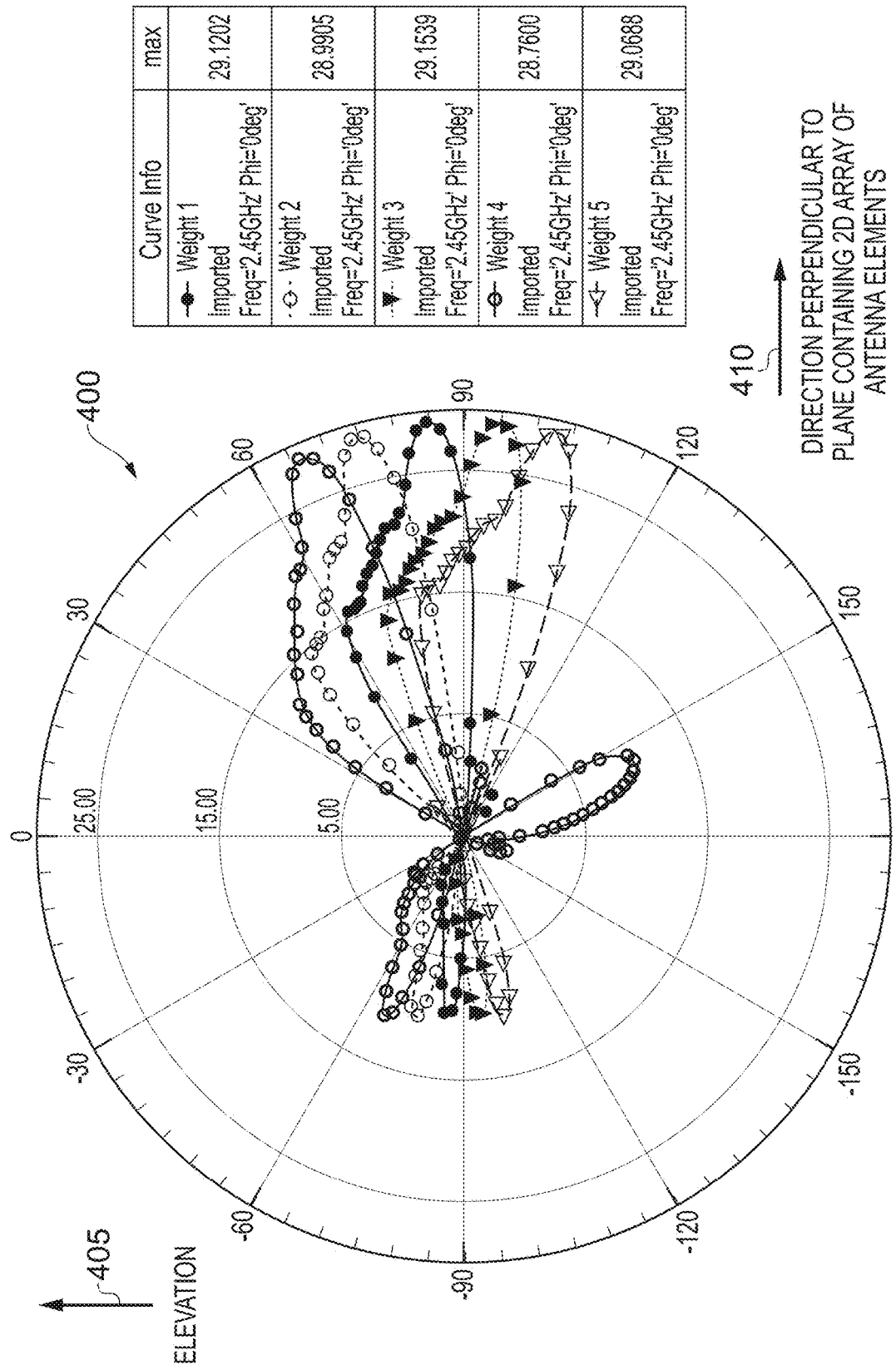
FIG. 5 provides an example of different beam patterns that can be obtained in one example arrangement by switching between different beamforming networks.

FIG. 5 is a diagram illustrating a particular example series of different beam patterns that can be produced dependent on which of five different beamforming networks are inserted into the path between the signal processing circuitry and a strip of antenna elements. The various patterns are shown within the two dimensional slice 400, and FIG. 5 shows both the elevation dimension 405 and the direction 410 that is perpendicular to the plane containing the 2D array of antenna elements 200 shown in FIG. 3. In accordance with this view, the earlier-mentioned azimuth dimension extends into and out of the page. Variation of the beam pattern within that azimuth dimension can be achieved using the digital beamforming technique discussed earlier with reference to the precoder 290 and additional beam control circuitry 310 of FIG. 3.

A wide variety of different beam patterns can be provided using the various beamforming networks described earlier. In one example implementation one or more of the beam patterns take the form of the earlier-mentioned cosecant-squared pattern, which can for example be used in a wireless communication system to communicate with moving aircraft. In particular, such beam patterns can be used to provide a constant power independent of the range of the aircraft (assuming the aircraft is travelling at a constant height), and different cosecant-squared patterns can be provided to cover different heights at which aircraft may be travelling.

However, it will be appreciated that the techniques described herein are not limited to use with any particular beam patterns, and various different beam patterns can be provided by the beamforming networks. For example, some of the beam patterns may be cosecant-squared patterns, whilst other patterns may be of different types if desired.

Figure 6:
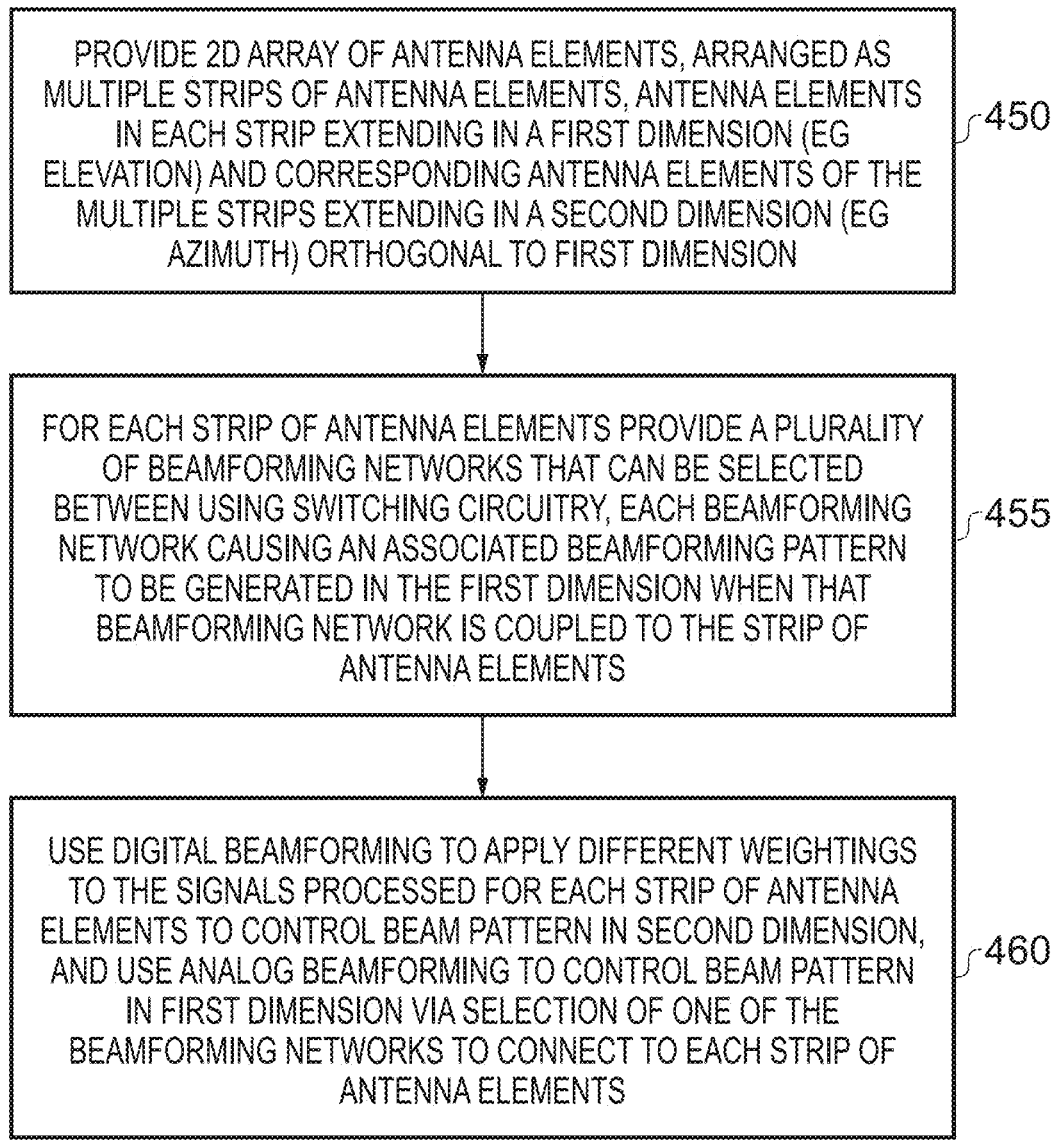
FIG. 6 is a flow diagram illustrating a method used in one example implementation to control an antenna beam.

FIG. 6 is a flow diagram illustrating a mechanism used in one example implementation in order to control an antenna beam. At step 450, a 2D array of antenna elements are provided, that are arranged as multiple strips of antenna elements. The antenna elements in each strip extend in a first dimension, for example the elevation dimension, whilst corresponding antenna elements within the multiple strips extend in a second dimension, for example the azimuth dimension, the second dimension being orthogonal to the first dimension.

As shown by step 455, for each strip of antenna elements a plurality of beamforming networks are provided that can be selected between using switching circuitry. Each beamforming network causes an associated beamforming pattern to be generated in the first dimension when that beamforming network is coupled to the strip of antenna elements.

As indicated by step 460, digital beamforming is used to apply different weightings to the signals processed for each strip of antenna elements in order to control the beam pattern in the second dimension, whilst analog beamforming is used to control the beam pattern in the first dimension via selection of one of the beamforming networks to connect to each strip of antenna elements. Hence, a hybrid beamforming approach is taken, using an analog beamforming mechanism in one dimension and a digital beamforming mechanism in the orthogonal dimension.

It has been found that by using the techniques described herein, a wide variety of different beam patterns can be employed, but with a significant reduction in cost and complexity when compared with known beamforming solutions.

In accordance with the techniques described herein, all radio frequency resources can for example be allocated for azimuth beamforming, whilst for the elevation pattern a dynamic beam shaping can be implemented using the multi-dimensional beamforming network. As a result, azimuth beamforming is promoted whilst elevation coverage holes may be filled at no extra cost for RF resources.

It will be appreciated that there are many applications in which the techniques described herein may be utilised. By way of specific example, such techniques can be used to extend the range and coverage of air-to-ground wireless systems as well as air surveillance radar and drone detector systems. As another example, the techniques can be used to ensure elevation pattern up tilt and down tilt in mobile base stations. This can for example be used to take into account various deployment scenarios (urban, mountains, etc). Such an approach can also allow for the replacing of mechanical tilting by using the different beam patterns available through the multiple beamforming networks, which can provide significant benefits for mobile operators, for example in terms of reduction in cost and complexity of the antenna system designs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An antenna apparatus comprising:
a strip of antenna elements extending in a first dimension;
a signal processing interface for connection to signal processing circuitry;
a plurality of beamforming networks, wherein each beamforming network is arranged, when coupled to the strip of antenna elements, to cause an associated beam pattern of the beamforming network to be generated by the strip of antenna elements;
switching circuitry to enable any one of the plurality of beamforming networks to be inserted between the strip of antenna elements and the signal processing interface;
each beamforming network coupling a first node of the beamforming network with multiple second nodes of the beamforming network in accordance with a coupling pattern of that beamforming network;
wherein when the switching circuitry causes a given beamforming network of the plurality of beamforming networks to be inserted between the strip of antenna elements and the signal processing interface, the signal processing interface is coupled to the first node, each antenna element is coupled to an associated one of the multiple second nodes, and the coupling pattern of the given beamforming network causes the associated beam pattern to be generated by the strip of antenna elements;
wherein, for each beamforming network, the coupling pattern of that beamforming network defines a connection between each second node and the first node that introduces at least one of phase and amplitude differences between two or more of the multiple second nodes, so as to implement analog beamforming via differential coupling of the multiple second nodes to the first node in accordance with the coupling pattern; and
wherein each beamforming network is provided within a corresponding layer of a multi-layered structure, with the switching circuitry enabling connection to be switched between different layers of the multi-layered structure in order to switch operation of the antenna apparatus between different beamforming networks.

2. An antenna apparatus as claimed in claim 1, wherein the switching circuitry comprises a signal processing interface switch to connect the signal processing interface to the first node of a selected beamforming network of the plurality of beamforming networks, and a plurality of antenna element switches, where each antenna element switch has a corresponding antenna element in the strip of antenna elements and is arranged to connect the corresponding antenna element to the associated one of the multiple second nodes of the selected beamforming network.

3. An antenna apparatus as claimed in claim 1, wherein the multi-layered structure is a multi-layer printed circuit board.

4. An antenna apparatus as claimed in claim 1, wherein at least one of the switching circuitry and the strip of antenna elements are mounted on the multi-layered structure.

5. An antenna apparatus as claimed in claim 1, where the strip of antenna elements comprises N antenna elements positioned in a linear arrangement.

6. An antenna apparatus as claimed in claim 5, wherein each beamforming network has N second nodes so as to provide a unique second node for each antenna element in the strip.

7. An antenna apparatus as claimed in claim 5, wherein the plurality of beamforming networks comprise L beamforming networks, and the switching circuitry provides L-way switching to allow any one of the beamforming networks to be selected.

8. An antenna apparatus as claimed in claim 1, wherein each beamforming network transfers RF signals between the first node and the multiple second nodes.

9. An antenna apparatus as claimed in claim 1, wherein for at least one beamforming network the associated beam pattern is a cosecant-squared pattern.

10. An antenna system comprising:
a plurality of instances of the antenna apparatus as claimed in claim 1, the strip of antenna elements of each instance being positioned relative to the strip of antenna elements of each other instance so as to collectively form a two dimensional array of antenna elements, such that corresponding antenna elements from each strip of antenna elements extend in a second dimension orthogonal to the first dimension.

11. An antenna system as claimed in claim 10, further comprising beam control circuitry to generate a beamforming network selection signal to control the switching circuitry of each instance of the plurality of instances of the antenna apparatus.

12. An antenna system as claimed in claim 11, wherein the beam control circuitry is arranged to cause the switching circuitry of each instance of the plurality of instances of the antenna apparatus to receive the same beamforming network selection signal so that at any point in time the same beamforming network is selected within each instance of the antenna apparatus.

13. An antenna system as claimed in claim 11, wherein:
the beam control circuitry is arranged to control beamforming of a beam produced by the two dimensional array of antenna elements in the first dimension by controlling selection of a beamforming network used by the plurality of instances of the antenna apparatus; and
the system comprises additional beam control circuitry to perform a beam control operation to control beamforming of the beam produced by the two dimensional array of antenna elements in the second dimension.

14. An antenna system as claimed in claim 13, wherein the additional beam control circuitry is arranged to perform the beam control operation by employing a digital beamforming operation.

15. An antenna system as claimed in claim 14, wherein the additional beam control circuitry is arranged to perform the beam control operation in order to independently control weightings applied to signals processed by each instance of the antenna apparatus so as to control a beam pattern of the beam in the second dimension.

16. An antenna system as claimed in claim 10, wherein the first dimension is an elevation dimension and the second dimension is an azimuth dimension.

17. A method of controlling an antenna beam of an antenna apparatus, the method comprising:
providing a strip of antenna elements extending in a first dimension;
providing a plurality of beamforming networks, wherein each beamforming network is arranged, when coupled to the strip of antenna elements, to cause an associated beam pattern of the beamforming network to be generated by the strip of antenna elements; and
employing switching circuitry to allow any one of the plurality of beamforming networks to be inserted between the strip of antenna elements and a signal processing interface used for connection to signal processing circuitry;
arranging each beamforming network to couple a first node of the beamforming network with multiple second nodes of the beamforming network in accordance with a coupling pattern of that beamforming network;
providing each beamforming network within a corresponding layer of a multi-layered structure, with the switching circuitry enabling connection to be switched between different layers of the multi-layered structure in order to switch operation of the antenna apparatus between different beamforming networks;
wherein when the switching circuitry causes a given beamforming network of the plurality of beamforming networks to be inserted between the strip of antenna elements and the signal processing interface, the signal processing interface is coupled to the first node, each antenna element is coupled to an associated one of the multiple second nodes, and the coupling pattern of the given beamforming network causes the associated beam pattern to be generated by the strip of antenna elements.

18. A method as claimed in claim 17, further comprising:
providing a plurality of instances of the strip of antenna elements, the strip of antenna elements of each instance being positioned relative to the strip of antenna elements of each other instance so as to collectively form a two dimensional array of antenna elements, such that corresponding antenna elements from each strip of antenna elements extend in a second dimension orthogonal to the first dimension;
controlling beamforming of a beam produced by the two dimensional array of antenna elements in the first dimension by controlling selection of a beamforming network used by the plurality of instances of the strip of antenna elements; and
performing a further operation to control beamforming of the beam produced by the two dimensional array of antenna elements in the second dimension.

* * * * *